United States Patent [19]

Hong

[11] 4,258,157
[45] Mar. 24, 1981

[54] INVERSION POLYMERIZATION PROCESS FOR PRODUCING VINYL RESINS USING COATED REACTORS

[75] Inventor: Paul O. Hong, Avon Lake, Ohio

[73] Assignee: The B. F. Goodrich Company, Akron, Ohio

[21] Appl. No.: 19,957

[22] Filed: Mar. 12, 1979

[51] Int. Cl.$^3$ .......................... C08F 2/00; C08F 2/18
[52] U.S. Cl. ........................................ 526/62; 526/74
[58] Field of Search .............. 427/414, 133, 135, 230; 428/35; 106/2, 38.22, 38.4; 526/62, 74; 422/131

[56] References Cited

U.S. PATENT DOCUMENTS

| | | | |
|---|---|---|---|
| 3,285,756 | 11/1966 | Moren | 106/38.4 |
| 3,669,946 | 6/1972 | Koyanagi et al. | 526/62 |
| 3,706,722 | 12/1972 | Nelson et al. | 526/216 |
| 3,778,423 | 12/1973 | Reiter | 526/62 |
| 3,804,924 | 4/1974 | Papetti et al. | 526/74 |
| 3,823,023 | 7/1974 | Duggins et al. | 427/133 |
| 3,825,434 | 7/1974 | Berens et al. | 422/131 |
| 4,117,215 | 9/1978 | Witenhafer et al. | 526/62 |
| 4,117,216 | 9/1978 | Witenhafer et al. | 526/62 |
| 4,142,033 | 2/1979 | Witenhafer | 526/62 |

FOREIGN PATENT DOCUMENTS 748727  5/1956  United Kingdom ..................... 526/216

*Primary Examiner*—Ronald H. Smith
*Assistant Examiner*—S. L. Chils
*Attorney, Agent, or Firm*—Roy P. Wymbs

[57] ABSTRACT

This invention relates to a process of producing vinyl polymers by an inversion polymerization technique in the presence of a coating on the internal surfaces of the polymerization reactor. The coating on said surfaces may be a singular layer or a dual layer coating. By inversion polymerization is meant conducting the initial stage of the polymerization reaction in a medium wherein the monomer or monomers being polymerized constitute the continuous phase and in the second or later stage of polymerization, water constitutes the continuous phase. The principal coating, or undercoating when a dual layer coating is employed, comprises a protein, such as egg albumen, and when a top coating is used it comprises a water-soluble suspending agent, such as an alkyl or alkyl hydroxyalkyl cellulose ether. When polymerizing olefinic monomers, such as vinyl halides, vinylidene halides, and vinylidene monomers having at least one terminal $CH_2=C<$ grouping, and mixtures thereof, in the presence of said coating, polymer buildup on the inner surfaces of the reaction vessel is substantially eliminated. With the present invention, multiple charges or batches of polymer can be made in said internally coated reaction vessel without opening the same between charges, thus preventing the escape of unreacted monomer to the atmosphere.

16 Claims, No Drawings ized polymers thereof, acrylate and methacrylate esters, such as methyl methacrylate, ethyl acrylate, 2-ethylhexyl acrylate, butyl methacrylate, etc., the aromatic vinyl compounds, such as styrene, alpha-methyl styrene, vinyl toluene, chlorostyrene, vinyl naphthalene, etc. Other vinylidene monomers which can likewise be polymerized by the present process are the diolefins including butadiene, isoprene, chloroprene and the like; esters of acrylic acid, as for example, methyl acrylate, ethyl acrylate, butyl acrylate, octyl acrylate, cyanoethyl acrylate, and the like; esters of methacrylic acid, such as methyl methacrylate, butyl methacrylate, etc.; and mixtures of any of the above-mentioned type of monomers and other vinylidene monomers copolymerizable therewith.

INVERSION POLYMERIZATION PROCESS FOR PRODUCING VINYL RESINS USING COATED REACTORS

BACKGROUND OF THE INVENTION

The inversion polymerization process for producing polymers, and particularly vinyl resins or polymers, is known and has been described in British Pat. No. 748,727. The process described in the British patent comprises forming an initial conversion of monomer(s) to polymer of up to 20% by mass polymerization of the monomer(s) in the presence of a suitable polymerization catalyst. In this first portion of the reaction, the monomer is the continuous phase. Thereafter, sufficient water is added to the polymerization system or medium to cause a phase inversion wherein the water becomes the continuous phase forming a dispersion of the unpolymerized monomer(s) in the water. This aqueous dispersion or suspension is then polymerized to convert substantially all of the remaining monomer(s) to solid polymer. However, this process has a significant disadvantage in that polymer buildup or scale on the internal surfaces of the reactor or "poly" is excessive and necessitates cleaning thereof after each batch or run is made.

In U.S. Pat. No. 3,706,722, issued Dec. 19, 1972, there is described an inversion polymerization process for producing vinyl polymers having improved uniformity and porosity, size and structure. The patentees accomplish this objective by incorporating a nonionic, monomer-soluble surface active agent in the initial continuous monomer phase. While producing a more porous polymer, the polymer buildup on the internal surfaces of the reactor is still a serious problem and detracts from the use of said process on a commercial basis. This is particularly true when producing polymers and copolymers of vinyl chloride where the buildup problem and health hazards, due to exposure to vinyl chloride, are acute.

Accordingly, there is a great need to produce polymers having uniform porosity, size and structure by the inversion polymerization process which will substantially eliminate polymer buildup and the difficulties attendant thereto.

SUMMARY OF THE INVENTION

I have found that if the inversion polymerization process of vinyl monomers is run in a reaction vessel having the proper coating on the internal surfaces thereof, polymer buildup on said surfaces is substantially eliminated. Further, the uniform porosity, size and structure of the polymer particles is not affected by the presence of such coating. In accordance with the present invention, the inner surfaces of the reactor are coated with a prime coating of a protein, such as albumen or casein, for example, and then optionally, a top coating is applied over the prime coating which is comprised of a water-soluble suspending agent, such as an alkyl or alkyl hydroxyalkyl cellulose ether. The proteins are the water-insoluble type or only slightly soluble in water. The protein coating is applied from an aqueous alkaline solution or an aqueous colloidal dispersion. When a dual coating is employed, the top coating is dissolved off the surfaces of the reactor, and any polymer buildup along with it, when, in the second stage of the polymerization reaction, water is the continuous phase.

DETAILED DESCRIPTION

In preparing the polymers of the instant invention, the first step or stage comprises forming an initial continuous phase of monomer or monomers, which phase contains essentially all of the monomer or monomers to be polymerized. The first phase, or monomer phase, is then polymerized to a conversion of monomer(s) to polymer of between about 1.0 and about 20.0% and preferably between about 5.0 and about 12.0%. In this first stage, the monomer(s) are polymerized in a mass type polymerization system. However, a water-in-monomer dispersion may be employed in the first stage with the monomer(s) still being the continuous phase. When using the water-in-monomer dispersion, about 0.1% by weight based on the weight of the water, of a water-soluble suspending agent is employed and the monomer(s) is uniformly mixed with at least 0.01% by weight, based on the weight of the monomer(s), of a monomer-soluble dispersing agent, and between about 0.01 and about 0.5% by weight of a monomer-soluble polymerization initiator or catalyst.

In the second stage of the inversion polymerization process, the water containing a water-soluble suspending or dispersing agent is added to the water-in-monomer dispersion or initially mass polymerized monomer mixture. The water solution can be added in any suitable manner but the water solution is added in such an amount so as to give the desired concentration of monomer(s) for final polymerization purposes. In this final polymerization stage, water constitutes the continuous phase.

The monomer-soluble dispersing agents for use in the inversion polymerization process, described above, are the nonionic monomer-soluble esters of fatty acids with glycerol, sorbitol and their polyoxyethylene derivatives and the nonionic, monomer-soluble multivalent metal salts of fatty acids, alkyl sulfonates and sulfates. As examples of such dispersing agents there may be named sorbitan monostearate, sorbitan tristearate, glycerol monooleate, glycerol monostearate, glycerol monopalmitate, sorbitan monooleate, and the like, calcium dilauryl sulfate, zinc dilauryl sulfate, barium distearyl sulfonate, aluminum trilauryl sulfate, and the like.

As examples of the water-soluble suspending agents useful in the above-described inversion polymerization process there may be named the water-soluble alkyl or hydroxyalkyl alkyl cellulose ethers wherein the alkyl group contains from 1 to 2 carbon atoms and the hydroxyalkyl groups contain from 2 to 4 carbon atoms. Any viscosity grade of the cellulose ethers may be used but it is preferred to use the lower viscosity grades, such as about 10 cps. (centipoises) to about 400 cps. By viscosity grade is meant the viscosity of a 2% aqueous solution of the cellulose ether measured at 20° C. The low viscosity grades of methyl cellulose and hydroxypropyl methyl cellulose are preferred cellulose ethers, since they are easily and readily dissolved in water.

The monomers employed in the present inversion polymerization process are the essentially water-insoluble, ethylenically unsaturated liquid monomers, or vinylidene monomers containing at least one terminal $CH_2=C<$ group, which form polymers which are insoluble in their monomers.

Examples of such monomers are the vinyl halides, such as vinyl chloride, vinyl bromide, etc., the vinylidene halides, such as vinylidene chloride, etc., the vinyl alkanoates, such as vinyl acetate, acrylonitrile and mixtures of said monomers. Other ethylenically unsaturated monomers may be used in admixture with the above monomers so long as such admixtures remain essentially insoluble in water and form polymers which are insoluble in their monomers. The most useful monomer in the inversion polymerization process is vinyl chloride and the invention will be described hereinafter in connection therewith, it being understood that this is intended for simplicity of description and is not intended in a limitative sense.

In the polymerization of the monomers, in accordance with the present invention, a monomer-soluble free radical producing catalyst or initiator is employed. Typical examples of monomer-soluble or oil-soluble catalysts that may be employed are the alkanoyl, aroyl, alkaroyl, and aralkanoyl diperoxides and monohydroperoxides, azo compounds, peroxy esters, percarbonates, and other free radical type catalysts which those skilled in the art are familiar with. As specific examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-di-chlorobenzoyl peroxide, naphthoyl peroxide, t-butyl perbenzoate, di-t-butyl perphthalate, isopropyl percarbonate, acetyl cyclohexane sulfonyl peroxide, di-secondary butyl peroxydicarbonate, t-butyl peroxyneodecanoate, di-normal propyl peroxydicarbonate, azo-bis-isobutyronitrile, α-α'-azodiisobutyrate, 2,2'-azo-bis-(2,4-dimethyl valeronitrile), and many others. The polymerization reaction is conducted at a temperature in the range of about 10° C. to about 90° C. However, usually a temperature of polymerization in the range of about 30° C. to about 80° C. is satisfactory.

In the practice of the inversion polymerization process of the present invention, the improvement comprises conducting said polymerization in a reactor, or polymerization vessel, which has been previously coated with a protein, and then, optionally, applying to said protein coating, as a top coating, a water-soluble coating. Various proteins may be used so long as they are gelforming and adhere to the internal surfaces of a polymerization vessel, whether it be of metal or glass, to form a gel which, in the later stages of the polymerization reaction, becomes water soluble when, in said stages, the water constitutes the continuous phase of the polymerization medium. The proteins useful herein are those which are soluble in water, or aqueous solutions of acids, bases or salts. Because of the large size of the protein molecules, the solutions thereof are colloidal in nature and it is possible to deposit a uniform coating thereof on the inner surfaces of polymerization reactors. The gelation of the protein is usually controlled by the concentration of the solution of the protein by loss of solvent, by heating or cooling thereof, or by a combination of the same. For example, the solutions of gelatin and casein become gels by the loss of solvent, the water dispersion, or colloidal solution, of egg albumen becomes a gel by heating, and the melts of animal glue containing a small amount of water become gels by cooling.

As examples of the proteins which may be used in the present invention, there may be named albumens, such as egg albumen, which has limited solubility in water; casein, which is soluble in dilute alkalies and concentrated acid and is almost insoluble in water, and which precipitates from weak acid solutions; gliadin, or prolamin, which is insoluble in water and soluble in 70–90 % alcohol, dilute acid and in alkali; gluten, which is a mixture of proteins derived principally from corn or wheat, but is also found in other grains and is soluble in dilute alkali solutions; zein; animal glue; and the like. As will be seen hereinafter, casein provides an unusually good coating for the purposes of the present invention.

The prime coating of protein can be used alone without a top coating of a water-soluble suspending agent. It is not disturbed when, in the first stage of polymerization, the monomer is the continuous phase. Since the proteins are gel-forming, the coating still performs its function of preventing polymer buildup in the second stage of polymerization when water is the continuous phase. However, since in normal suspension polymerization of ethylenically unsaturated monomers by the inversion technique, most of the polymer buildup occurs in the first part of the polymerization reaction, or when the monomer is the continuous phase, it is often desirable to have a water soluble coating in contact with the monomer-phase polymerization medium. Hence the use of a water-soluble top coating over the protein prime coating.

The prime coating and top coating solutions of the present invention are made by conventional methods, using heat and agitation where necessary. When making a protein prime coating, one, or more than one, of said proteins is dissolved in water or an aqueous solution of an alkali, acid, or salt, depending on the protein being used. The coating solution is made up with a solids content such that it can be painted or brushed on the inner reactor surfaces or sprayed on said surfaces through appropriate spray nozzles. Usually a coating solution having a solids content of protein(s) in the range of about 0.1% to about 20.0% by weight is satisfactory. However, since the solids content of the coating solution depends upon the molecular weight of the particular protein(s) being used, it could, in certain instances, be greater than 20.0% or less than 0.1% by weight. Among the solvents that may be employed in making the prime coatings, other than water, there may be named, by way of example, aqueous alkali metal hydroxide solutions, such as those of sodium, potassium, lithium, etc., aqueous acids, such as HCl, acetic acid, etc., aqueous salt solutions, such as sodium chloride, potassium chloride, etc., aqueous alcohol solutions, such as those of methanol, ethanol, etc.

The top coating, which is comprised of a water-soluble suspending agent, is applied over the prime coating by means of an aqueous solution thereof. The coating solution is applied by any suitable means, such as by flooding the reactor and then draining, by spraying on and then draining the reactor, etc. Once applied, it is not necessary to dry the top coating and the reactor can be charged immediately after draining the excess top coating therefrom. Whether or not the top coating is dried, care must be taken to not permanently remove the coating by getting water, under pressure or turbulent, directly in contact with the wall or inner coated surfaces. As examples of water-soluble suspending agents, useful as a top coating in the present invention, there may be named methyl cellulose, hydroxypropyl methyl cellulose, polyvinyl alcohol, polyethylene oxide, polyvinyl pyrrolidone, and the like.

In the top coating, when used, the suspending agent is employed in a concentration in the range of about 0.05% to about 10% by weight. Usually, a concentration in the range of about 0.5% to about 5.0% by weight is used. For example, a 2.0% by weight solution of hydroxypropyl methyl cellulose in water is very satisfactory. It is understood, of course, that the concentration of the top coating solution will depend in great part upon the molecular weight of the suspending agent being employed. Hence, in some instances, the concenration of the suspending agent in the coating solution could be less than about 0.05% by weight or more than about 10% by weight.

In the first stage of the polymerization when the monomer(s) constitutes the continuous phase, the top coating, when used, is insoluble in said phase and substantially prevents the buildup of polymer on the internal surfaces of the reactor. In the second stage of the reaction when the water constitutes the continuous phase, the top coating is dissolved off the surfaces into the reaction medium leaving the prime coating or undercoating intact. If any polymer buildup has occurred during the first stage, it is removed into the reaction medium when the top coating is dissolved therein. Surprisingly, it has been found that what little polymer buildup that may occur on the top coating during the first stage does not affect the finished polymer quality even though removed into the reaction medium. Any large "sandy" buildup polymer particles would, in any event, be separated when the finished polymer is screened after passing through the dryer.

In order to further illustrate the present invention, the following specific examples are given. It is to be understood, however, that this is merely intended in an illustrative and not in a limitative sense. In the examples, all parts and percents are by weight unless otherwise indicated.

EXAMPLE I

In this Example, the inner surfaces of the polymerization reactor were coated with a prime coating of egg albumin. Sufficient egg albumin was added to demineralized water, with stirring, to give a 1% by weight of a colloidal solution of the albumin. The internal surfaces of the reactor were coated with said solution by spraying on and then rinsed with demineralized water. Thereafter the surfaces were coated with a top coating of a 4% by weight of an aqueous solution of hydroxypropyl methyl cellulose and allowed to drain. The excess coating solution was removed from the reactor by draining. It was not necessary to dry the coating.

After having coated the reactor surfaces, 0.68 part of sorbitan monostearate, based on 100 parts of monomer to be polymerized, was charged to the reactor. The reactor was then evacuated and thereafter 0.02 part per hundred monomer of a 20% solution of di-secondary butyl peroxydicarbonate in hexane was charged to the reactor followed by 100 parts of vinyl chloride. The reactor was then heated to 52° C. at about 120 psig. pressure. Then 40 parts of demineralized water containing 0.04 part of hydroxypropyl methyl cellulose was added to the reactor over a period of aproximately 15 minutes with agitation and in such a manner as to avoid direct contact with the coated inner wall. The first stage polymerization was then continued with agitation for a period of about one hour or to a conversion of monomer to polymer of about 8% had occurred.

After completion of the first stage polymerization, wherein the monomer constituted the continuous phase, 160 parts of demineralized water containing 0.16 part of hydroxypropyl methyl cellulose was metered into the reactor over a period of about one hour. Thereafter the polymerization reaction was continued in the second stage, at the same temperature as the first stage, with water being the continuous phase. The polymerization was continued until the pressure in the reactor reached 90 psig. This resulted in a total conversion of monomer to polymer of about 85%. The polymer was then removed from the reactor and dried in the usual manner. Upon removal of the polymer or polymer slurry from the reactor, the inner surfaces thereof were examined and found to be substantially free of polymer buildup. What polymer buildup did occur was very light and not of the difficult to remove type, which requires scraping and/or other means to remove the same. The polymer produced as above described had large and uniform particle size and had high porosity as evidenced by its ability to readily absorb plasticizer.

EXAMPLE II

In this Example, the inner surfaces of the polymerization reactor were coated with a single coating of egg albumin. No top coating was employed. The egg albumin was added to demineralized water, with stirring, to give a 1% by weight of a colloidal solution of the albumin. The surfaces were then coated with said solution, as in Example I. Following the recipe and procedure of Example I, vinyl chloride was polymerized in the reactor while in contact with the albumin coating. While there was more buildup on the reactor surfaces, upon completion of the polymerization reaction, than in Example I, the amount of polymer buildup was substantially less than that encountered when no coating at all was used.

EXAMPLE III

In this Example, the inner surfaces of the polymerization reactor were coated with a prime coating of casein. Sufficient casein was added to a 0.25% by weight aqueous solution of sodium hydroxide to give a 1% by weight solution of casein. The internal surfaces of the reactor were coated with said solution by spraying on and then rinsing with demineralized water. Thereafter the surfaces were coated with a top coating of 3% by weight of an aqueous solution of hydroxypropyl methyl cellulose and allowed to drain. The excess coating solution was removed from the reactor by draining. The coating was not dried prior to start of the polymerization. Thereafter the reactor was charged and the polymerization conducted as described in Example I. After completion of the polymerization reaction and removal of the polymer from the reactor, the inner surfaces thereof were examined and found to be essentially clean, that is, with little or no polymer buildup thereon. The reactor here was cleaner than in Example I and the polymer quality was the same as that in Example I.

EXAMPLE IV

In this Example the reactor surfaces were coated with a prime coating of gluten using a coating solution of 1% by weight of gluten in 1% aqueous sodium hydroxide. The coating was applied as in Example I and rinsed with demineralized water. A top coating was then applied as in Example I which was a 4% by weight aqueous solution of hydroxypropyl methyl cellulose. In polymerizing vinyl chloride in the thus coated reactor, the recipe and procedure of Example I was followed. Upon removal of the resultant polymer, the reactor surfaces were examined. The polymer buildup was greater than Example I but still superior to that obtained when no coating was used. The polymer buildup that did occur was of the easily removable type and the polymer quality was the same as that described in Example I. That is, the polymer buildup that did occur did not adversely affect the resultant polymer quality.

Coating of the internal surfaces of the polymerization reactor with a prime coating alone, and with a prime coating in conjunction with a top coating, in accordance with the present invention, for use with the inversion polymerization process, substantially reduces polymer buildup on said surfaces. This substantially reduces the down time for cleaning the reactors in the plant thus resulting in increased production over a unit period of time. The polymer buildup, if any, in the first stage, or the monomer(s) continuous phase, is removed into the reaction medium by dissolution of the top coating and in those instances where a little polymer buildup does accumulate on the interior surfaces, it is not of the hard, rough, difficult-to-remove type and is easily removed without employing the difficult and tedious scraping methods that have heretofore been necessary in the art. The polymer buildup thus removed into the reaction medium does not have any deleterious effect on the quality of the finished polymer. Further, the polymers produced in accordance with the present invention are of a highly uniform size, shape and porosity. These polymers also have improved bulk density, low gel content and good flow characteristics. The polymer particles are capable of enhanced, uniform, plasticizer absorption. Numerous other advantages of the present invention will be apparent to those skilled in the art.

While the present invention has been described in terms of its specific embodiments, certain modifications and equivalents will be apparent to those skilled in the art and are intended to be included within the scope of the appended claims.

I claim:

1. In a process of inversion polymerizing substantially water-insoluble polymerizable ethylenically unsaturated monomer(s) in a reaction vessel by first forming a continuous monomer(s) phase in the presence of a monomer-soluble surface active agent and a monomer-soluble catalyst, polymerizing said monomer phase at a temperature in the range of about 10° C. to about 90° C. with agitation until a conversion to polymer less than about 20% occurs, adding sufficient water to the monomer-polymer mixture with agitation and in the presence of at least about 0.01% by weight of a water-soluble suspending agent for said monomer(s) to form a suspension wherein water is the continuous phase, then polymerizing the suspension at a temperature in the range of about 10° C. to about 90° C. to convert the remaining monomer(s) to polymer, the improvement which comprises (1) applying at least one coating to the internal surfaces of said reaction vessel, said coating being comprised of a gel-forming protein, (2) polymerizing the continuous monomer phase in constant contact with said coating, and (3) polymerizing said continuous water phase in constant contact with said coating, whereby polymer buildup on said internal surfaces is substantially eliminated.

2. A process as defined in claim 1 wherein a top coating is applied to said coating of protein prior to polymerization, said top coating being comprised of a water-soluble suspending agent and wherein said top-coating is dissolved in the said continuous water phase.

3. A process as defined in claim 1 wherein said protein is egg albumen.

4. A process as defined in claim 1 wherein said protein is casein.

5. A process as defined in claim 1 wherein said protein is gliadin.

6. A process as defined in claim 1 wherein said protein is gluten.

7. A process as defined in claim 1 wherein said continuous monomer phase is a water-insoluble monomer dispersion.

8. A process as defined in claim 1 wherein the monomer is vinyl chloride.

9. A process as defined in claim 2 wherein the water-soluble suspending agent is hydroxypropyl methyl cellulose.

10. A process as defined in claim 2 wherein the water-soluble suspending agent is methyl cellulose.

11. A process as defined in claim 2 wherein the monomer is vinyl chloride.

12. A process as defined in claim 1 wherein the monomer-soluble surface active agent is selected from the group consisting of nonionic esters of fatty acids with glycerol, sorbitol and their polyoxyethylene derivatives, and nonionic multi-valent metal salts of fatty acids, alkyl sulfonates and sulfates.

13. A process as defined in claim 12 wherein the monomer is vinyl chloride.

14. A process as defined in claim 13 wherein the surface active agent is sorbitan monostearate.

15. A process as defined in claim 14 wherein the protein is egg albumen.

16. A process as defined in claim 14 wherein the protein is casein.

* * * * *